United States Patent
Lee et al.

(10) Patent No.: US 9,094,836 B2
(45) Date of Patent: Jul. 28, 2015

(54) METHOD FOR CALCULATING FAIRNESS INDEX AND METHOD FOR ALLOCATING RESOURCES BASED ON THE FAIRNESS INDEX IN COEXISTENCE MANAGEMENT SYSTEM

(71) Applicant: Electronics and Telecommunications Research Institute, Daejeon (KR)

(72) Inventors: Dong Hun Lee, Daejeon (KR); Hyun Duk Kang, Gwangju (KR); Byung Jang Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 135 days.

(21) Appl. No.: 13/921,150

(22) Filed: Jun. 18, 2013

(65) Prior Publication Data

US 2014/0080530 A1    Mar. 20, 2014

(30) Foreign Application Priority Data

Sep. 15, 2012 (KR) .......................... 10-2012-0102508
Mar. 11, 2013 (KR) .......................... 10-2013-0025473

(51) Int. Cl.
*H04W 16/14* (2009.01)

(52) U.S. Cl.
CPC .................................... *H04W 16/14* (2013.01)

(58) Field of Classification Search
CPC .... H04W 16/14; H04W 84/12; H04B 7/0452; H04B 7/0617
See application file for complete search history.

(56) References Cited

U.S. PATENT DOCUMENTS

| | | | | |
|---|---|---|---|---|
| 8,909,274 B2* | 12/2014 | Kasslin et al. | ................ | 455/509 |
| 2005/0085235 A1* | 4/2005 | Park et al. | ..................... | 455/450 |
| 2007/0087756 A1* | 4/2007 | Hoffberg | ..................... | 455/450 |
| 2009/0257392 A1* | 10/2009 | Hosein | ......................... | 370/329 |
| 2011/0305206 A1 | 12/2011 | Junell et al. | | |
| 2012/0083303 A1* | 4/2012 | Min et al. | ..................... | 455/502 |

* cited by examiner

*Primary Examiner* — Bobbak Safaipour

(57) ABSTRACT

Provided is a method of calculating a fairness index that is a criterion indicating fairness of resource allocation between coexistence managers in a coexistence management system, the method including: calculating a normalized resource allocation amount by normalizing an amount of resources allocated to a corresponding coexistence manager to an amount of resources required by the corresponding coexistence manager with respect to each of the coexistence managers; and calculating the fairness index using the normalized resource allocation amounts calculated with respect to the respective coexistence managers.

19 Claims, 5 Drawing Sheets

METHOD FOR CALCULATING FAIRNESS INDEX AND METHOD FOR ALLOCATING RESOURCES BASED ON THE FAIRNESS INDEX IN COEXISTENCE MANAGEMENT SYSTEM

CROSS-REFERENCE TO RELATED APPLICATIONS

This application claims priority to and the benefit of Korean Patent Application No. 10-2012-0102508 filed on Sep. 15, 2012 and Korean Patent Application No. 10-2013-0025473 filed on Mar. 11, 2013 in the Korean Intellectual Property Office, the entire contents of which are incorporated herein by reference.

TECHNICAL FIELD

The present invention relates to a coexistence management system, and more particularly, to a method of calculating a fairness index as a criterion indicating fairness of resource allocation in a coexistence management system and a method of allocating resources based on the fairness index.

BACKGROUND ART

In a current communication system, active research is being conducted in order to provide users with services having a variety of quality of services (QoS) at a high transmission rate. In the communication system, research for providing a large capacity service including a variety of QoS using limited resources, for example, frequency resources is actively ongoing. In particular, with development in a propagation communication technology and appearance of a new wireless communication technology, a necessity to more efficiently use finite frequency resources is being emphasized.

As a method for increasing use efficiency of limited frequency resources in the communication system, proposed are methods of optimizing performance of the communication system, for example, methods for maximizing the spectrum efficiency through multiple access, encoding, modulation, information compression, and the like, and also minimizing interference with a communication system using a different scheme. Proposed is a frequency sharing method for increasing use efficiency of frequency resources using a frequency band available in a frequency band already being used, such as a television (TV) band.

Here, in the aforementioned method of sharing a frequency in a frequency band available in a frequency band already being used such as a TV band, the available frequency band needs to be used without causing interference against a primary incumbent having the precedence right to use the TV band and thus, it is important to detect the available frequency band by verifying whether the primary incumbent is using the frequency band in the TV band. When a plurality of different systems desiring to use the available frequency band detected in the TV band is present, there is difficulty in coexisting with the available frequency band due to a difference in communication scheme between the plurality of different systems, for example, a wireless access scheme, and the like.

A mutual coexistence technology refers to a spectrum management technology that enables wireless devices using different communication protocols to mutually coexist without causing harmful interference in a core frequency (30 MHz to 10 GHz) in which various dynamic spectrum access (DSA) technologies are predicted to appear. A DSA technology is a concept opposite to a current static spectrum management technology, and refers to a wireless access and management technology that maximizes flexibility and efficiency of using a frequency by dynamically managing a spectrum based on a peripheral propagation environment of a wireless device. A technology is developed to induce a mutual coexistence criterion capable of effectively operating a plurality of sharing technologies on a national level for spectrum management in preparation for frequency sharing technologies that are variously appearing for each wireless service, such as the Institute of Electrical and Electronics Engineers (IEEE) 802, SCC 41, and the like.

Domestically, research on an integrated mutual coexistence condition of various sharing technologies for securing the optimal frequency efficiency in an interfering propagation environment such as a frequency auction system, sharing of a license band and a non-license band, and the like, is not being conducted systematically. The IEEE 802.19, which is an international standardization organization, refers to a wireless coexistence working group (WG) that handles a coexistence issue between 802 standards, and is discussing technical issues on a coexistence scenario between wireless systems that share a frequency in a license band and a non-license band, mutual coexistence analysis, a sharing mechanism for the mutual coexistence, and the like.

SUMMARY OF THE INVENTION

The present invention has been made in an effort to provide a method for calculating a fairness index as a criterion indicating fairness of resource allocation in a coexistence management system.

The present invention also provides a method for fairly and effectively allocating resources based on a fairness index that is a criterion indicating fairness of resource allocation in a coexistence management system.

An exemplary embodiment of the present invention provides a method of calculating a fairness index that is a criterion indicating fairness of resource allocation between coexistence managers in a coexistence management system, the method including: calculating a normalized resource allocation amount by normalizing an amount of resources allocated to a corresponding coexistence manager to an amount of resources required by the corresponding coexistence manager with respect to each of the coexistence managers; and calculating the fairness index using the normalized resource allocation amounts calculated with respect to the respective coexistence managers.

The calculating of the fairness index may calculate the fairness index using the number of coexistence managers, a square of sum of the normalized resource allocation amounts, and a sum of squares of the normalized resource allocation amounts.

The calculating of the fairness index may calculate, as the fairness index, a value that is acquired by dividing the square of sum of the normalized resource allocation amounts by a multiplication between the number of coexistence managers and the sum of squares of the normalized resource allocation amounts.

The amount of resources allocated to the corresponding coexistence manager may be a multiplication between a bandwidth allocated to the corresponding coexistence manager and an occupancy allocated to the corresponding coexistence manager.

The amount of resources required by the corresponding coexistence manager may be a sum of multiplications between required bandwidths and required occupancies of the respective white space objects (WSOs) that are registered to the corresponding coexistence manager and entities to perform data transmission and reception.

The normalized resource allocation amount may be calculated using the following equation:

$$X_m = \frac{A_m(= B_m \times O_m)}{\sum_{n=1}^{N_m} B_{m,n}^{Req} \times O_{m,n}^{Req}}$$

Here, $X_m$ denotes the normalized resource allocation amount of an $m^{th}$ coexistence manager, $N_m$ denotes the number of WSOs that are registered to the $m^{th}$ coexistence manager and entities to perform data transmission and reception, $B_{m,n}^{Reg}$ denotes a required bandwidth of an $n^{th}$ WSO registered to the $m^{th}$ coexistence manager, $O_{m,n}^{Reg}$ denotes a required occupancy of the $n^{th}$ WSO registered to the $m^{th}$ coexistence manager, $A_m$ denotes an amount of resources allocated to the $m^{th}$ coexistence manager, $B_m$ denotes a bandwidth allocated to the $m^{th}$ coexistence manager, and $O_m$ denotes an occupancy allocated to the $m^{th}$ coexistence manager.

The fairness index may be calculated using the following equation:

$$F_{Index} = \frac{\left(\sum_{m=1}^{M_{CM}} (X_m)\right)^2}{M_{CM} \times \sum_{m=1}^{M_{CM}} (X_m)^2}$$

Here, $F_{Index}$ denotes the fairness index, $X_m$ denotes the normalized resource allocation amount of the $m^{th}$ coexistence manager, and $M_{CM}$ denotes the number of coexistence managers.

Another exemplary embodiment of the present invention also provides a method of allocating resources between coexistence managers based on a fairness index that is a criterion indicating fairness of resource allocation between coexistence managers in a coexistence management system, wherein the fairness index is calculated using a normalized resource allocation amount of each of the coexistence managers, and the normalized resource allocation amount is calculated by normalizing an amount of resources allocated to a corresponding coexistence manager to an amount of resources required by the corresponding coexistence manager, and the method includes: determining an initial value of an amount of resources to be allocated to each of the coexistence managers; calculating the normalized resource allocation amount with respect to each of the coexistence managers based on the determined initial value, and calculating the fairness index using the calculated normalized resource allocation amount; comparing the calculated fairness index with a predetermined threshold value, and reallocating resources between at least a portion of the coexistence managers based on the comparison result; and recalculating the normalized resource allocation amount with respect to each of the at least a portion of the coexistence managers based on the reallocation result, and recalculating the fairness index using the recalculated normalized resource allocation amount.

The resource allocation method may further include repeating the recalculating using the recalculated fairness index.

The reallocating may reallocate the resources between the at least a portion of the coexistence managers when the calculated fairness index is less than the predetermined threshold value.

The determining may determine a value acquired by dividing a sum of available bandwidths by the number of coexistence managers as the initial value of the amount of resources to be allocated to each of the coexistence managers.

The reallocating may include: extracting, from among the coexistence managers, a first coexistence manager having the minimum normalized resource allocation amount and a second coexistence manager having the maximum normalized resource allocation amount; and reallocating resources to the first coexistence manager and the second coexistence manager.

The reallocating of the resources to the first coexistence manager and the second coexistence manager may reallocate the resources so that a portion of resources allocated to the second coexistence manager is redistributed to the first coexistence manager.

The reallocating of the resources to the first coexistence manager and the second coexistence manager may redistribute a portion of the resources allocated to the second coexistence manager to the first coexistence manager so that the normalized resource allocation amount of the second coexistence manager is identical to the normalized resource allocation amount of the first coexistence manager.

According to exemplary embodiments of the present invention, a coexistence management system may calculate a fairness index as a criterion indicating fairness of resource allocation between coexistence managers.

According to exemplary embodiments of the present invention, a coexistence management system may fairly and effectively allocate resources between coexistence managers based on a fairness index that is a criterion indicating fairness of resource allocation between coexistence managers.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
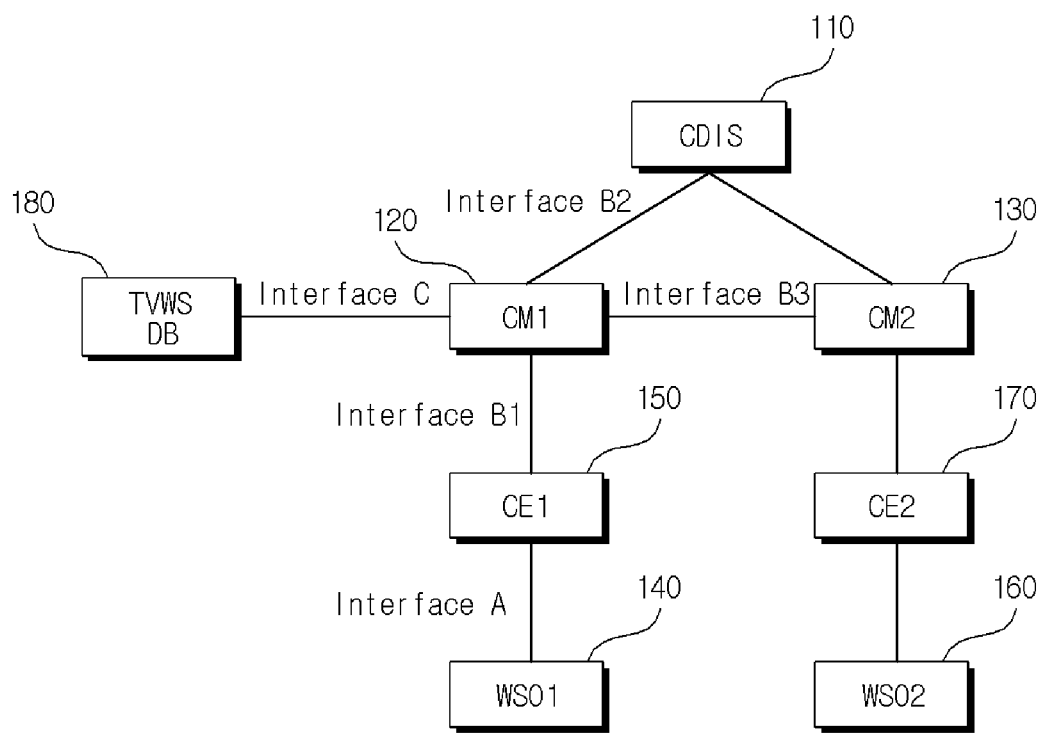
FIG. 1 is a diagram schematically illustrating a structure of a coexistence management system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the following description and the accompanying drawings, like reference numerals refer to like constituent elements and thus, a repeated description will be omitted. When it is determined that the detailed description related to a related known function or configuration may make the purpose of the present invention unnecessarily ambiguous in describing the present invention, the detailed description will be omitted here.

The exemplary embodiments of the present invention are applied to a coexistence management system for detecting a frequency band, for example, an idle frequency band (hereinafter, referred to as a white space (WS)), which is available in a frequency band already being used, such as a television (TV) band, and efficiently using the detected available frequency band in a communication system, for example, a cognitive radio ((CR) and hereinafter, referred to as a CR) system, an Institute of Electrical and Electronics Engineers (IEEE) 802.19 based system, or an IEEE 802.22 based system. Here, although a description will be made using the CR system, the IEEE 802.19 based system, and the IEEE 802.22 based system as an example, the method proposed in the present invention may also be applied to other communication systems.

In the exemplary embodiment of the present invention, the coexistence management system enables a plurality of different systems to coexist and thereby efficiently use an available frequency band in a TV band. Here, in the exemplary embodiment of the present invention, entities of the coexistence management system for sharing an available frequency band in a communication system mutually coexist, and a plurality of different systems, particularly, systems using different communication schemes, for example, a wireless access scheme, coexist. Accordingly, the coexisting systems are enabled to share an available frequency band in a frequency band already being used such as a TV band, thereby improving the use efficiency of frequency resources.

That is, in the exemplary embodiment of the present invention, the coexistence management system for coexistence and frequency sharing between the plurality of different systems in the communication system may share the available frequency band, thereby improving the use efficiency of limited frequency resources. Here, in the exemplary embodiment of the present invention, a frequency in the frequency band available in the frequency band already being used such as the TV band needs to be shared. Here, the available frequency band needs to be used without causing interference against a primary incumbent having the precedence right to use the TV band. Accordingly, the available frequency band is detected by verifying whether the primary incumbent is using the frequency band in the TV band. A plurality of different systems desiring to use the available frequency band detected from the TV band selects and uses an operating channel in the detected available frequency band through coexistence and frequency sharing. That is, in the exemplary embodiment of the present invention, a resource management system for coexistence and frequency sharing between the plurality of different systems in the communication system enables a predetermined object to select an operating channel in a WS for effective coexistence. In this instance, to effectively select the operating channel in the WS, the resource management system classifies and thereby allocates channels available in the WS.

Here, the coexistence management system performs a message transmission/reception procedure for efficient coexistence and frequency sharing between the plurality of different systems in a band available in the TV band, that is, in a TVWS. That is, for effective coexistence and frequency sharing between a plurality of systems using the TVWS, the coexistence management system transmits and receives a message between the respective objects of the coexistence management system. In particular, the coexistence management system transmits and receives a message about registration, coexistence information gathering, coexistence decision making, reconfiguration, measurement, and an event, thereby improving the efficiency of coexistence and frequency sharing between the plurality of systems in the TVWS.

FIG. 1 is a diagram schematically illustrating a structure of a coexistence management system according to an exemplary embodiment of the present invention.

Referring to FIG. 1, the coexistence management system includes white space objects (WSOs) 140 and 160 that are entities to perform data transmission and reception as sharing devices desiring to use an available frequency band through frequency sharing between a plurality of different systems when the plurality of different systems desires to use the available frequency band in a frequency band already being used such as a TV band, that is, a TVWS, coexistence managers ((CMs) and hereinafter, referred to as CMs), for example, CM1 120 and CM2 130 to manage the WSOs 140 and 160 in order to improve the efficiency of sharing a frequency between the WSOs 140 and 160, coexistence enablers ((CE) and hereinafter, referred to as CEs), for example, CE1 150 and CE2 170 that are included in the WSOs 140 and 160, or independently positioned to thereby perform a path functionality between the WSOs 140 and 160 and the CMs 120 and 130, respectively, a server, for example, a coexistence discovery and information server ((CDIS) and hereinafter, referred to as a CDIS) 110 to support control of the CMs 120 and 130, and the WSOs 140 and 160, and a TVWS database ((TVWS DB) and hereinafter, referred to as a TVWS DB) 180 to provide channel information about the available band in the TV band, that is, the TVWS.

As described above, the WSOs 140 and 160 indicate devices of a plurality of different systems, that is, secondary systems that are desired to be used by another user (hereinafter, referred to as a secondary system) not having the precedence right to use the TV band by detecting a predetermined frequency band as an available frequency band in the TV band when a primary incumbent (hereinafter, also referred to as a primary system) having the precedence right to use the TV band does not use a predetermined frequency band in the TV band. Here, to more efficiently use limited frequency resources, the WSOs 140 and 160 share and thereby use the predetermined frequency band through coexistence and frequency sharing. That is, the WSOs 140 and 160 are allocated with a channel in the TVWS, and transmit and receive data using the allocated channel. A WSO may refer to a TV band device ((TVBD) and hereinafter, referred to as a TVBD), or a network of TVBDs.

As described above, the CEs 150 and 170 are independently positioned within the WSOs 140 and 160 to thereby transmit and receive information of the WSOs 140 and 160 and information of the CMs 120 and 130, respectively. Here, in the exemplary embodiment of the present invention, for better understanding and ease of description, the CEs 150 and 170 will be described to be independently present with respect to the WSOs 140 and 160, but the CEs 150 and 170 may be included in the WSOs 140 and 160 or may also be included in the CMs 120 and 130.

The CEs 150 and 170 may extract, from the WSOs 140 and 160, context information associated with the corresponding WSOs 140 and 160, requested by the CMs 120 and 130, respectively, for example, information such as a wireless access scheme of the WSOs 140 and 160, transmission power thereof, a spectrum sensing threshold value thereof, a position thereof, and the like, and transmit the extracted context information to the CMs 120 and 130. That is, the CEs 150 and 170 acquire information associated with communication of the respective systems as context information about different secondary systems and thereby transmit the acquired information to the CMs 120 and 130.

The CEs 150 and 170 receive a request of the CMs 120 and 130 for managing the WSOs 140 and 160, for example, a request for context information and configuration of the WSOs 140 and 160, update the context information of the WSOs 140 and 160 in response to the request, and reset, that is, reconfigure the configuration of the WSOs 140 and 160. That is, in response to the request for the context information of the WSOs 140 and 160, the CEs 150 and 170 receive converted information of the context information, that is, event information of the WSOs 140 and 160 and update the context information of the WSOs 140 and 160 based on the event information. In response to the request for the configuration of the WSOs 140 and 160, the CEs 150 and 170 receive constituent element resetting of the WSOs 140 and 160 and reset, that is, reconfigure constituent elements of the WSOs 140 and 160 based on the constituent element resetting.

To improve the efficiency of sharing a frequency between the WSOs 140 and 160, the CMs 120 and 130 determine operating frequency allocation, transmission power allocation, transmission time allocation, and the like. That is, to improve the efficiency of sharing the frequency between the WSOs 140 and 160 with respect to a frequency band available in the aforementioned TV band, the CMs 120 and 130 perform resource allocation, such as the operating frequency allocation, the transmission power allocation, the transmission time allocation, and the like, with respect to the WSOs 140 and 160.

Here, to further improve the efficiency of sharing the frequency between the WSOs 140 and 160, the CMs 120 and 130 perform the operating frequency allocation, the transmission power allocation, and the transmission time allocation with respect to corresponding WSOs in the available frequency band by transmitting and receiving information to and from CMs of WSOs not corresponding thereto, that is, neighbor CMs, for example, by transmitting and receiving context information and event information of the WSOs. In this instance, the CMs 120 and 130 acquire the context information and the event information of the WSOs not corresponding thereto through direct transmission and reception with the other CMs (e.g., the neighbor CMs), or acquire the context information and the event information through transmission and reception with the other CMs over the CDIS 110. The CMs 120 and 130 acquire information about spectrum use in the primary system, that is, channel information about a channel available in the TV band through an external database, for example, the TVWS DB 180, or request the other CMs for constituent element resetting of the WSOs corresponding thereto.

As described above, the CDIS 110 supports a control operation of the CMs 120 and 130 for sharing the frequency between the WSOs 140 and 160 with respect to the available frequency channel in the TV band. That is, the CDIS 110 receives context information and event information of the WSOs 140 and 160 from the CMs 120 and 130, stores the received context information and event information, and transmits the context information and the event information of the WSOs 140 and 160 to the CMs 120 and 130 in response to the request of the CMs 120 and 130. The CDIS 110 acquires and stores information about the spectrum use in the primary system, that is, channel information about the available channel in the TV band, through the external database, for example, the TVWS DB 180.

The TVWS DB 180 provides channel information about the available channel in the TVWS, that is, shared channel information to the CMs 120 and 130. The channel information is provided only to WSOs that are registered to the TVWS DB 180 and of which identification numbers are authenticated.

Here, as described above, the WSOs 140 and 160 refer to devices of secondary systems for sharing and thereby using the available frequency band, and may be base stations ((BSs) and hereinafter, referred to as a BS), access points ((AP) and hereinafter, referred to as an AP), service access points ((SAPs) and hereinafter, referred to as SAPs), terminals, and the like. As described above, the secondary systems refer to a plurality of different systems for sharing the available frequency band and may be systems using different communication systems, for example, the IEEE 802.19 based system and the IEEE 802.22 based system, and the like.

In the exemplary embodiment of the present invention, WSOs are registered to CMs corresponding thereto for coexistence of the TVWS and frequency sharing. A CM registers the CM to CMs that neighbor the CM. That is, neighbor CMs of each of CMs are registered to a corresponding CM.

In a communication system according to an exemplary embodiment of the present invention, the coexistence management system performs a registration procedure, a coexistence information gathering procedure, a coexistence decision making procedure, a reconfiguration procedure, a measurement procedure, and an event procedure by transmitting and receiving predetermined messages for coexistence and frequency sharing between the WSOs 140 and 160 with respect to an available frequency band in a frequency band already being used, particularly, as described above, for efficient coexistence and frequency sharing between a plurality of systems, for example, the WSOs 140 and 160 in the TVWS. That is, the aforementioned procedures are performed by transmitting and receiving the predetermined messages between the respective objects of the coexistence management system. Accordingly, the plurality of systems improves frequency use efficiency through effective coexistence and frequency sharing in the TVWS.

The coexistence management system is operated in a management mode and an autonomous mode (or an information mode). In the management mode, the coexistence management system reflects setting of a frequency sharing device, that is, a WSO and resetting of configuration, which are instructed by a CM. In the autonomous mode, the coexistence management system autonomously makes a decision about coexistence and frequency sharing based on information associated with coexistence and frequency sharing that is provided from the CM to a CE, and reflects the decided coexistence and frequency sharing in the WSO. The coexistence management system is operated on a centralized topology and a distributed topology. On the centralized topology, a plurality of slave CMs is connected to a predetermined single master CM among a plurality of CMs. Here, the slave CMs are controlled by the master CM for coexistence and frequency sharing between WSOs. On the distributed topology, coexistence and frequency sharing between the WSOs are achieved through negotiation between a predetermined CM among the plurality of CMs and neighbor CMs of the predetermined CM.

In the coexistence management system based on the management mode, one of the most important issues in terms of mutual coexistence between WSOs is fairness of resource allocation. An exemplary embodiment of the present invention proposes a method of calculating a fairness index that is a criterion indicating fairness of resource allocations between CMs and a method of allocating resources between CMs based on the fairness index.

Figure 2:
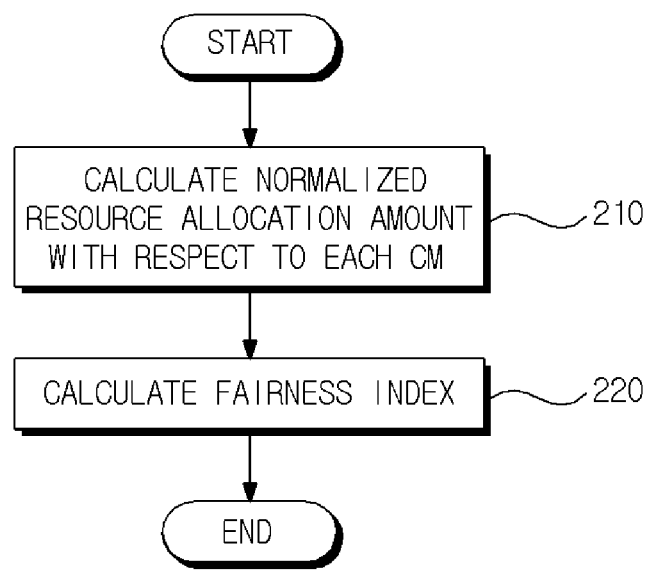
FIG. 2 is a flowchart illustrating a method of calculating a fairness index according to an exemplary embodiment of the present invention.

FIG. 2 is a flowchart illustrating a method of calculating a fairness index according to an exemplary embodiment of the present invention.

In the case of a centralized topology, calculation of the fairness index according to the present exemplary embodiment may be performed by a master CM. In the case of a distributed topology, calculation of the fairness index according to the present exemplary embodiment may be performed by a predetermined CM, or may be performed through cooperation between CMs.

In the present exemplary embodiment, a resource is allocated to each of neighbor CMs. Specifically, a bandwidth and an occupancy (e.g., temporal occupancy) in the bandwidth are allocated. Neighbor WSOs are registered to each of the neighbor CMs. A required bandwidth and a required occupancy are predetermined for each WSO.

In operation 210, a CM calculates a normalized resource allocation amount by normalizing an amount of resources allocated to a corresponding CM to an amount of resources required by the corresponding CM with respect to each of the CMs. Here, the amount of resources allocated to each of the CMs may be defined as a multiplication between a bandwidth allocated to a corresponding CM and an occupancy allocated to the corresponding CM. The amount of resources required by each of the CMs may be defined as a sum of amounts of resources required by WSOs that are registered to the corresponding CM and thus, may be defined as a sum of multiplications between required bandwidths and required occupancies of the WSOs.

The normalized resource allocation amount calculated in operation 210 may be expressed by the following Equation 1.

$$X_m = \frac{A_m(=B_m \times O_m)}{\sum_{n=1}^{N_m} B_{m,n}^{Req} \times O_{m,n}^{Req}}$$ [Equation 1]

Here, $X_m$ denotes the normalized resource allocation amount of an $m^{th}$ CM, $N_m$ denotes the number of WSOs that are registered to the $m^{th}$ CM, $B_{m,n}^{Reg}$ denotes a required bandwidth of an $n^{th}$ WSO registered to the $m^{th}$ CM, $O_{m,n}^{Reg}$ denotes a required occupancy of the $n^{th}$ WSO registered to the $m^{th}$ CM, $A_m$ denotes an amount of resources allocated to the $m^{th}$ CM, $B_m$ denotes a bandwidth allocated to the $m^{th}$ CM, and $O_m$ denotes an occupancy allocated to the $m^{th}$ CM.

In operation 220, the CM calculates the fairness index using the normalized resource allocation amounts of the respective CMs calculated in operation 210.

$X_m$ denotes the "normalized" resource allocation amount. Thus, when $X_m$ is identical with respect to all of the CMs, it can be said to be "completely" fair. In the present exemplary embodiment, the fairness index is calculated using $X_m$. In this instance, the fairness index is calculated using the number of neighbor CMs $M_{CM}$, the square of sum of $X_m$ values, $$\left(\sum_{m=1}^{M_{CM}} (X_m)\right)^2,$$

and the sum of squares of $X_m$ values, $$\sum_{m=1}^{M_{CM}} (X_m)^2.$$

Specifically, a value acquired by dividing the square of sum of $X_m$ values by the multiplication between $M_{CM}$ and the sum of squares of $X_m$ may be calculated as the fairness index.

The fairness index $F_{Index}$ calculated in operation 220 may be expressed by the following Equation 2.

$$F_{Index} = \frac{\left(\sum_{m=1}^{M_{CM}} (X_m)\right)^2}{M_{CM} \times \sum_{m=1}^{M_{CM}} (X_m)^2}$$ [Equation 2]

$F_{Index}$ has a value between "0" and "1", and has a value of "1" in a completely fair case and has a value of "0" in a completely unfair case. Accordingly, $F_{Index}$ may intuitively indicate fairness of resource allocation between CMs. For example, when the $X_m$ value is identical with respect to all of the CMs, $F_{Index}$ has a value f "1" as follows.

$$F_{Index} = \frac{(M_{CM}X)^2}{M_{CM} \times M_{CM}(X)^2}$$
$$= 1$$

Figure 3:
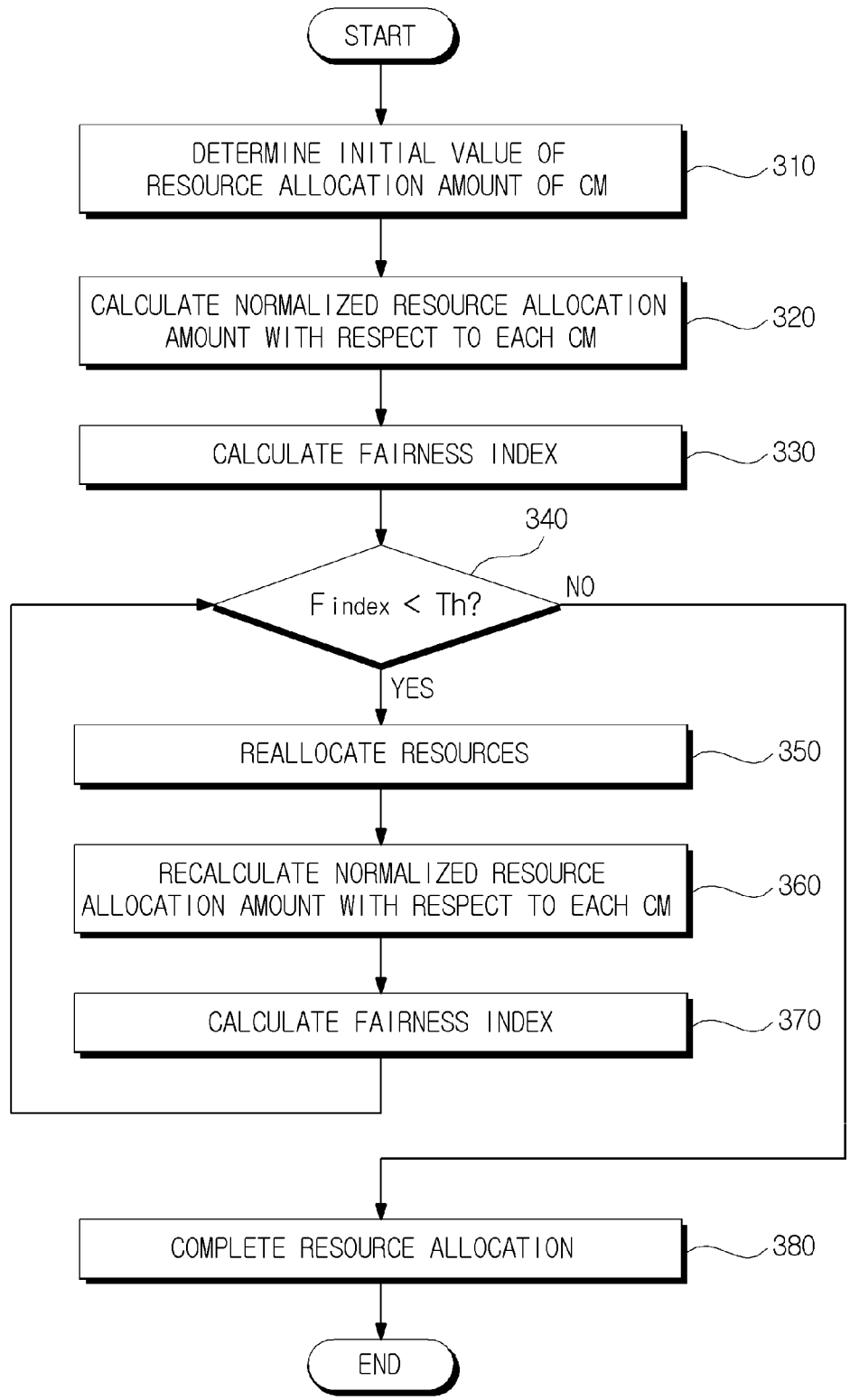
FIG. 3 is a flowchart illustrating a method of allocating resources between coexistence managers based on a fairness index according to an exemplary embodiment of the present invention.

FIG. 3 is a flowchart illustrating a method of allocating resources between CMs based on a fairness index according to an exemplary embodiment of the present invention.

In the case of a centralized topology, resource allocation according to the present exemplary embodiment may be performed by a master CM. In the case of a distributed topology, resource allocation according to the present exemplary embodiment may be performed by a predetermined CM or may be performed through cooperation between CMs.

In the present exemplary embodiment, allocating a resource to a CM indicates allocating a bandwidth and an occupancy to the CM, and an amount of allocated resources is defined as a multiplication between the bandwidth and the occupancy. Neighbor WSOs are registered to each of the neighbor CMs. A required bandwidth and a required occupancy are predetermined for each WSO. In the present exemplary embodiment, for better understanding and ease of description, available channels provided from a TVWS DB are assumed to be identical with respect to neighbor CMs and neighbor WSOs.

In operation 310, a CM determines an initial value of an amount of resources to be allocated to each of the CMs. Here, the initial value allocated to each of the CMs may be determined to be identical. For example, a value acquired by dividing a sum of bandwidths of all of the available channels by the number of neighbor CMs may be determined as the initial value. The initial value $A_m^{init}$ to be allocated to the m$^{th}$ CM may be expressed by the following Equation 3.

$$A_m^{init} = \frac{\sum \text{all available channels bandwidth}}{M_{CM}} \quad \text{[Equation 3]}$$

$$\text{for } m = 1, 2, \ldots, M_{CM}$$

Here, $M_{CM}$ denotes the number of neighbor CMs.

The bandwidth and the occupancy to be allocated to each CM may be determined as an appropriate value based on the initial value $A_m^{init}$.

In operation 320, the CM calculates the normalized resource allocation amount $X_m$ with respect to each of the CMs based on the determined initial value as above. As described above, the normalized resource allocation amount is calculated by normalizing the initial value of the amount of resources allocated to the corresponding CM to an amount of resources required by the corresponding CM. The normalized resource allocation amount of the m$^{th}$ CM may be expressed by the following Equation 4.

$$X_m = \frac{A_m^{init}}{\sum_{n=1}^{N_m} B_{m,n}^{Req} \times O_{m,n}^{Req}} \quad \text{for } m = 1, 2, \ldots, M_{CM} \quad \text{[Equation 4]}$$

Here, $X_m$ denotes the normalized resource allocation amount of the m$^{th}$ CM, $N_m$, denotes the number of WSOs that are registered to the m$^{th}$ CM, $B_{m,n}^{Reg}$ denotes a required bandwidth of an n$^{th}$ WSO registered to the m$^{th}$ CM, and $O_{m,n}^{Reg}$ denotes a required occupancy of the n$^{th}$ WSO registered to the m$^{th}$ CM.

In operation 330, the CM calculates the fairness index using the normalized resource allocation amount of each CM calculated in operation 320. The fairness index $F_{Index}$ may be expressed by the following Equation 5.

$$F_{Index} = \frac{\left(\sum_{m=1}^{M_{CM}} (X_m)\right)^2}{M_{CM} \times \sum_{m=1}^{M_{CM}} (X_m)^2} \quad \text{[Equation 5]}$$

In operation 340, the CM compares the calculated fairness index with a predetermined threshold value. The threshold value is a value that is used as a criterion to determine whether resource allocation is fair using the fairness index. When the fairness index is less than the threshold value, the resource allocation may be regarded to be unfair. When the fairness index is greater than or equal to the threshold value, the resource allocation may be regarded to be fair. The threshold value may be preset as a predetermined value that is greater than "0" and less than "1", and may vary based on a system environment or an operation environment.

Accordingly, when the fairness index is greater than or equal to the threshold value as a result of comparing the fairness index with the threshold value, the resource allocation is completed using the allocated resource by performing operation 380.

On the contrary, when the fairness index is less than the threshold value as a result of comparing the fairness index with the threshold value, resources are reallocated between at least a portion of the CMs by performing operation 350. For example, by redistributing resources between a CM having the minimum normalized resource allocation amount and a CM having the maximum normalized resource allocation amount, resources are reallocated between the CMs, thereby resulting in increasing the fairness index. A specific method of resource reallocation will be described with reference to FIG. 4.

When the resources are reallocated between the CMs through operation 350, the CM recalculates the normalized resource allocation amount with respect to each of the CMs reallocated with the resources in operation 360. In operation 370, the CM recalculates the fairness index using the normalized resource allocation amounts of the CMs that include the normalized resource allocation amounts of the CMs reallocated with the resources. Operations 360 and 370 are substantially identical to the aforementioned operations 210 and 220, respectively. Here, when performing operation 360, the normalized resource allocation amount is already calculated with respect to remaining CMs excluding the CMs reallocated with the resources. Accordingly, in operation 360, the normalized resource allocation amount may be calculated with respect to the CMs reallocated with the resources. However, depending on cases, the normalized resource allocation amount may also be calculated with respect to all of the neighbor CMs in operation 360.

When the fairness index is recalculated, the recalculated fairness index is compared with the threshold value by returning to operation 340. Based on the comparison result, the resource allocation is completed by performing operation 380 or operations 350 to 370 are repeated. Accordingly, referring to FIG. 3, operations 350 to 370, that is, the resource reallocation, the normalized resource allocation amount calculation, and the fairness index calculation are repeated when the fairness index is less than the threshold value Th. When the fairness index is greater than or equal to the threshold value Th, the resource allocation is completed by performing operation 380. Consequently, according to the present exemplary embodiment, resources are allocated to CMs so that the fairness index becomes to be greater than or equal to the threshold value.

Figure 4:
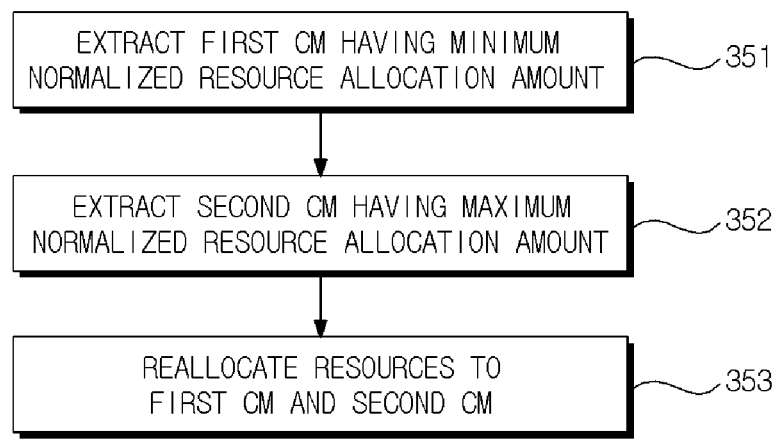
FIG. 4 is a flowchart illustrating an operation of reallocating resources of FIG. 3 according to an exemplary embodiment of the present invention.

FIG. 4 is a flowchart illustrating in detail operation 350, that is, an operation of reallocating resources according to an exemplary embodiment of the present invention. According to the present exemplary embodiment, resources are redistributed between a CM having the minimum normalized resource allocation amount and a CM having the maximum normalized resource allocation amount among CMs. In the present specification, for better understanding and ease of description, the first is referred to as a first CM and the second is referred to as a second CM. The reason of redistributing the resources between the first CM and the second CM is because the CM having the minimum normalized resource allocation amount and the CM having the maximum normalized resource allocation amount are biggest cause in decreasing the fairness index and it is possible to effectively increase the fairness index by adjusting resource allocation amounts thereof.

In operation 351, the CM extracts, from among the CMs, the first CM having the minimum normalized resource allocation amount. When the first CM is an $m_{min}{}^{th}$ CM, operation 351 may be expressed by the following equation.
Find $$[m_{min}] = \min_m(X_m), m = 1, 2, \ldots, M_{CM}$$

In operation 352, the CM extracts, from among the CMs, the second CM having the maximum normalized resource allocation amount. When the second CM is an $m_{max}{}^{th}$ CM, operation 352 may be expressed by the following equation.
Find $$[m_{max}] = \max_m(X_m), m = 1, 2, \ldots, M_{CM}$$

As described above, $X_m$ is a value acquired by normalizing an amount of resources allocated to a corresponding CM to an amount of resources required by the corresponding CM. Accordingly, the second CM may be a CM having a relatively large amount of allocated resources compared to an amount of required resources. The first CM may be a CM having a relatively small amount of allocated resources compared to an amount of required resources.

Accordingly, in operation 353, resources are reallocated to the second CM and the first CM so that at least a portion of resources allocated to the second CM is redistributed to the first CM. That is, within the range of resources allocated to the first CM and the second CM, an amount of resources allocated to the second CM may be decreased and an amount of resources allocated to the first CM may be increased. Reallocation of resources between the second CM and the first CM as above is for fairness of resources between the second CM and the first CM. Accordingly, as an example, the resources may be reallocated so that the normalized resource allocation amount of the second CM is identical to the normalized resource allocation amount of the first CM. That is, referring to the above Equation 1, a denominator is a value fixed to a predetermined CM and thus, it is possible to make the $X_m$ value of the second CM and the $X_m$ value of the first CM be identical by adjusting the numerator $A_m$. The numerator $A_m$ may be adjusted by adjusting the bandwidth $B_m$ and/or the occupancy $O_m$. In the above example, operation 353 may be expressed by the following Equation 6.

$$X_{m_{max}}\left(=\frac{A_{m_{max}}(=B_{m_{max}} \times O_{m_{max}})}{\sum_{n=1}^{N_{m_{max}}} B_{m_{max},n}^{Req} \times O_{m_{max},n}^{Req}}\right)= \quad \text{[Equation 6]}$$

$$X_{m_{min}}\left(=\frac{A_{m_{min}}(=B_{m_{min}} \times O_{m_{min}})}{\sum_{n=1}^{N_{m_{min}}} B_{m_{min},n}^{Req} \times O_{m_{min},n}^{Req}}\right)$$

Referring again to FIG. 3, when the normalized resource allocation amount is recalculated with respect to each CM using the adjusted allocation resources of the second CM and the first CM (operation 360) and the fairness index is recalculated based on the recalculated normalized resource allocation amount, the recalculated fairness index becomes to have an increased value compared to a previous value. That is, fairness of resource allocation is improved.

The exemplary embodiment of resource reallocation described above with reference to FIG. 4 is only an example and thus, resource reallocation in another form is also possible without departing from the scope of the present invention. For example, a method of extracting, from among CMs, at least two CMs having a relatively large normalized resource allocation amount and at least two CMs having a relatively small normalized resource allocation amount, and reallocating resources therebetween may also be used. As another example, although the normalized resource allocation amount of the first CM and the normalized resource allocation amount of the second CM are not necessarily identical, the bandwidth and/or the occupancy may be adjusted so that the difference therebetween may fall within a predetermined range.

Figure 5:
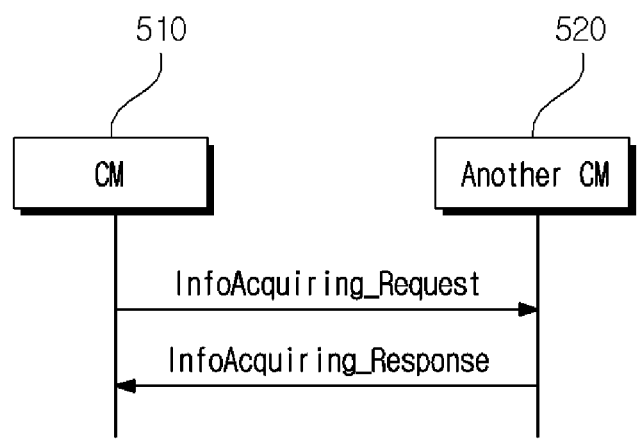
FIG. 5 is a diagram illustrating a process of requesting fairness index information and responding between coexistence managers.

FIG. 5 is a diagram illustrating a process of requesting fairness index information and responding between CMs during a fairness index calculation and resource allocation process according to an exemplary embodiment of the present invention. In FIG. 5, a CM 510 corresponds to a CM that does not have fairness index information and another CM 520 corresponds to a CM that has calculated fairness index information. In the case of a centralized topology, the another CM 520 may be a master CM, and the CM 510 may be a slave CM. In the case of a distributed topology, the CM 510 and the another CM 520 may be predetermined CMs.

Referring to FIG. 5, the CM 510 transmits, to the another CM 520, an InfoAcquiring_Request message requesting the another CM 520 for a fairness index. In response thereto, the another CM 520 transmits, to the CM 510, an InfoAcquiring_Response message including fairness index information and threshold information. Data types of the InfoAcquiring_Request/InfoAcquiring_Response messages are shown as follows:

```
ReqInfoDescr:: = SEQUENCE OF EUNMERATED{
    ...
    Fairness
    Threshold,
}
ReqInfValue ::=SEUENCE OF SEQUENCE{
    reqInfoDescr ReqInfoDescr,
    reqInfoValue      CHOICE{...
        FairnessValue      REAL,
        ThresholdValue     REAL}
}
```

Meanwhile, the aforementioned exemplary embodiments of the present invention may be provided as a program executable in a computer, and may be configured in a general purpose digital computer that operates the program using computer readable media. The computer readable media include storage media such as magnetic storage media (for example, ROM, floppy disks, hard disks, and the like), and optical recording media (for example, CD-ROM, digital versatile disks (DVD), and the like).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of calculating a fairness index that is a criterion indicating fairness of resource allocation between coexistence managers in a coexistence management system, the method comprising:
    calculating a normalized resource allocation amount by normalizing an amount of resources allocated to a corresponding coexistence manager to an amount of resources required by the corresponding coexistence manager with respect to each of the coexistence managers; and
    calculating the fairness index using the normalized resource allocation amounts calculated with respect to the respective coexistence managers,
    wherein the calculating of the fairness index comprises calculating the fairness index using the number of coexistence managers, a square of sum of the normalized resource allocation amounts, and a sum of squares of the normalized resource allocation amounts.

2. The method of claim 1, wherein the calculating of the fairness index comprises calculating, as the fairness index, a value that is acquired by dividing the square of sum of the normalized resource allocation amounts by a multiplication between the number of coexistence managers and the sum of squares of the normalized resource allocation amounts.

3. The method of claim 1, wherein the amount of resources allocated to the corresponding coexistence manager is a multiplication between a bandwidth allocated to the corresponding coexistence manager and an occupancy allocated to the corresponding coexistence manager.

4. The method of claim 1, wherein the amount of resources required by the corresponding coexistence manager is a sum of multiplications between required bandwidths and required occupancies of the respective white space objects (WSOs) that are registered to the corresponding coexistence manager and entities to perform data transmission and reception.

5. The method of claim 1, wherein the normalized resource allocation amount is calculated using the following equation:

$$X_m = \frac{A_m(=B_m \times O_m)}{\sum_{n=1}^{N_m} B_{m,n}^{Req} \times O_{m,n}^{Req}}$$

where $X_m$ denotes the normalized resource allocation amount of an $m^{th}$ coexistence manager, $N_m$ denotes the number of WSOs that are registered to the $m^{th}$ coexistence manager and entities to perform data transmission and reception,
$B_{m,n}^{Reg}$ denotes a required bandwidth of an $n^{th}$ WSO registered to the $m^{th}$ coexistence manager, $O_{m,n}^{Reg}$ denotes a required occupancy of the $n^{th}$ WSO registered to the $m^{th}$ coexistence manager, $A_m$ denotes an amount of resources allocated to the $m^{th}$ coexistence manager, $B_m$ denotes a bandwidth allocated to the $m^{th}$ coexistence manager, and $O_m$ denotes an occupancy allocated to the $m^{th}$ coexistence manager.

6. The method of claim 1, wherein the fairness index is calculated using the following equation:

$$F_{Index} = \frac{\left(\sum_{m=1}^{M_{CM}} (X_m)\right)^2}{M_{CM} \times \sum_{m=1}^{M_{CM}} (X_m)^2}$$

where $F_{index}$ denotes the fairness index, $X_m$, denotes the normalized resource allocation amount of the $m^{th}$ coexistence manager, and $M_{CM}$ denotes the number of coexistence managers.

7. A method of allocating resources between coexistence managers based on a fairness index that is a criterion indicating fairness of resource allocation between coexistence managers in a coexistence management system, wherein:
    the fairness index is calculated using a normalized resource allocation amount of each of the coexistence managers, and the normalized resource allocation amount is calculated by normalizing an amount of resources allocated to a corresponding coexistence manager to an amount of resources required by the corresponding coexistence manager, and
    the method comprises:
    determining an initial value of an amount of resources to be allocated to each of the coexistence managers;
    calculating the normalized resource allocation amount with respect to each of the coexistence managers based on the determined initial value, and calculating the fairness index using the calculated normalized resource allocation amount;
    comparing the calculated fairness index with a predetermined threshold value, and reallocating resources between at least a portion of the coexistence managers based on the comparison result; and
    recalculating the normalized resource allocation amount with respect to each of the at least a portion of the coexistence managers based on the reallocation result, and recalculating the fairness index using the recalculated normalized resource allocation amount.

8. The method of claim 7, further comprising:
    repeating the recalculating using the recalculated fairness index.

9. The method of claim 7, wherein the reallocating reallocates the resources between the at least a portion of the coexistence managers when the calculated fairness index is less than the predetermined threshold value.

10. The method of claim 7, wherein the determining determines a value acquired by dividing a sum of available bandwidths by the number of coexistence managers as the initial value of the amount of resources to be allocated to each of the coexistence managers.

11. The method of claim 7, wherein the reallocating comprises:
    extracting, from among the coexistence managers, a first coexistence manager having the minimum normalized resource allocation amount and a second coexistence manager having the maximum normalized resource allocation amount; and
    reallocating resources to the first coexistence manager and the second coexistence manager.

12. The method of claim 11, wherein the reallocating of the resources to the first coexistence manager and the second coexistence manager reallocates the resources so that a portion of resources allocated to the second coexistence manager is redistributed to the first coexistence manager.

13. The method of claim 12, wherein the reallocating of the resources to the first coexistence manager and the second coexistence manager redistributes a portion of the resources allocated to the second coexistence manager to the first coexistence manager so that the normalized resource allocation amount of the second coexistence manager is identical to the normalized resource allocation amount of the first coexistence manager.

14. The method of claim 7, wherein the fairness index is calculated using the number of coexistence managers, a square of sum of the normalized resource allocation amounts, and a sum of squares of the normalized resource allocation amounts.

15. The method of claim 14, wherein the fairness index is calculated as a value that is acquired by dividing the square of sum of the normalized resource allocation amounts by a multiplication between the number of coexistence managers and the sum of squares of the normalized resource allocation amounts.

16. The method of claim 7, wherein the amount of resources allocated to the corresponding coexistence manager is a multiplication between a bandwidth allocated to the corresponding coexistence manager and an occupancy allocated to the corresponding coexistence manager.

17. The method of claim 7, wherein the amount of resources required by the corresponding coexistence manager is a sum of multiplications between required bandwidths and required occupancy of the respective WSOs that are registered to the corresponding coexistence manager and entities to perform data transmission and reception.

18. The method of claim 7, wherein the normalized resource allocation amount is calculated using the following equation:

$$X_m = \frac{A_m(=B_m \times O_m)}{\sum_{n=1}^{N_m} B_{m,n}^{Req} \times O_{m,n}^{Req}}$$

where $X_m$ denotes the normalized resource allocation amount of an $m^{th}$ coexistence manager, $N_m$, denotes the number of WSOs that are registered to the $m^{th}$ coexistence manager and entities to perform data transmission and reception, $B_{m,n}^{Reg}$ denotes a required bandwidth of an $n^{th}$ WSO registered to the $m^{th}$ coexistence manager, $O_{m,n}^{Reg}$ denotes a required occupancy of the $n^{th}$ WSO registered to the $m^{th}$ coexistence manager, $A_m$ denotes an amount of resources allocated to the $m^{th}$ coexistence manager, $B_m$ denotes a bandwidth allocated to the $m^{th}$ coexistence manager, and $O_m$ denotes an occupancy allocated to the $m^{th}$ coexistence manager.

19. The method of claim 8, wherein the fairness index is calculated using the following equation:

$$F_{Index} = \frac{\left(\sum_{m=1}^{M_{CM}} (X_m)\right)^2}{M_{CM} \times \sum_{m=1}^{M_{CM}} (X_m)^2}$$

where $F_{index}$ denotes the fairness index, $X_m$, denotes the normalized resource allocation amount of the $m^{th}$ coexistence manager, and $M_{CM}$ denotes the number of coexistence managers.

* * * * *